US007752421B2

(12) United States Patent  
Archer et al.

(10) Patent No.: US 7,752,421 B2
(45) Date of Patent: Jul. 6, 2010

(54) PARALLEL-PREFIX BROADCAST FOR A PARALLEL-PREFIX OPERATION ON A PARALLEL COMPUTER

(75) Inventors: Charles J. Archer, Rochester, MN (US); Amanda Peters, Rochester, MN (US); Gary R. Ricard, Chatfield, MN (US); Albert Sidelnik, St. Paul, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 11/737,209

(22) Filed: Apr. 19, 2007

(65) Prior Publication Data

US 2008/0263329 A1    Oct. 23, 2008

(51) Int. Cl.
G06F 15/76 (2006.01)
(52) U.S. Cl. ...................................................... 712/16
(58) Field of Classification Search .................... None
See application file for complete search history.

(56) References Cited

U.S. PATENT DOCUMENTS

| | | | |
|---|---|---|---|
| 4,715,032 A | 12/1987 | Nilsson | |
| 5,083,265 A | 1/1992 | Valiant | |
| 5,513,371 A | 4/1996 | Cypher et al. | |
| 5,617,538 A | 4/1997 | Heller | |
| 5,721,828 A | 2/1998 | Frisch | |
| 5,822,604 A | 10/1998 | Ogasawara et al. | |
| 5,832,215 A * | 11/1998 | Kato et al. | 709/230 |
| 5,864,712 A | 1/1999 | Carmichael et al. | |
| 5,867,649 A | 2/1999 | Larson | |
| 5,878,241 A * | 3/1999 | Wilkinson et al. | 712/203 |
| 5,958,017 A | 9/1999 | Scott et al. | |

(Continued)

FOREIGN PATENT DOCUMENTS

EP        1835414 A2 *  9/2007

OTHER PUBLICATIONS

Herbordt, M.C., Weems, C.C. "Computing parallel prefix and reduction using coterie structures" Frontiers of Massively Parallel Computation, 1992., Fourth Symposium on the; Oct. 19-21, 1992, pp. 141-149.*

(Continued)

*Primary Examiner*—Eddie P Chan
*Assistant Examiner*—Jacob Petranek
(74) *Attorney, Agent, or Firm*—Biggers & Ohanian, LLP

(57) ABSTRACT

A parallel-prefix broadcast for a parallel-prefix operation on a parallel computer includes: configuring, on each node, a parallel-prefix contribution buffer for storing the node's parallel-prefix contribution; configuring, on each node, a parallel-prefix results buffer for storing results of a operation, the results buffer having a position for each node that corresponds to node's rank; and repeatedly for each position in the results buffer: processing in parallel by each node, including: determining, by the node, whether the current position in the results buffer is to include the node's contribution, if the current position is not to include the contribution, contributing the identity element, and if the current position is to include the contribution, contributing the contribution, performing, by each node, the operation using the contributed identity elements and the contributed contributions, yielding a result from the operation, and storing, by each node, the result in the position in the results buffer.

18 Claims, 7 Drawing Sheets

U.S. PATENT DOCUMENTS

| | | | |
|---|---|---|---|
| 6,000,024 A * | 12/1999 | Maddox | 712/11 |
| 6,094,715 A | 7/2000 | Wilkinson et al. | |
| 6,212,617 B1 | 4/2001 | Hardwick | |
| 6,292,822 B1 | 9/2001 | Hardwick | |
| 6,334,138 B1 | 12/2001 | Kureya | |
| 6,754,211 B1 | 6/2004 | Brown | |
| 6,914,606 B2 | 7/2005 | Amemiya et al. | |
| 2002/0016901 A1 | 2/2002 | Carvey et al. | |
| 2002/0144027 A1 | 10/2002 | Schmisseur | |
| 2004/0034678 A1* | 2/2004 | Kuszmaul et al. | 708/446 |
| 2004/0073590 A1* | 4/2004 | Bhanot et al. | 708/534 |
| 2005/0094577 A1 | 5/2005 | Ashwood-Smith | |

OTHER PUBLICATIONS

Fisher, A.L., Highnam, P.T. "Computing the Hough Transform on a Scar Line Array Processor" IEEE transactions on pattern analysis and machine intelligence, vol. II, No. 3, Mar. 1989, pp. 262-265.*

Ladner et al., "Parallel Prefix Computation", Journal of the ACM (JACM), Oct. 1980, pp. 831-838, vol. 27, Issue 4, Seattle, WA, USA.

Hillis et al., "Data Parallel Algorithms", Communications of the ACM, Dec. 1986, pp. 1170-1183, vol. 29, Issue 12, Cambridge, MA, USA.

Sun et al., "A Massively Parallel Algorithm for Compact Finite Difference Schemes", 1994 International Conference on Parallel Processing, Aug. 1994, pp. 282-289, vol. 3, USA.

Ad. http://www.core.org.cn/NR/rdonlyres/Mathematics/18-337jSpring2003/0FC2E288-915C-4DE6-B85F-0774D54F3E72/0/lec4.pdf Parallel Prefix Algorithms—Lecture.

Sunggu Lee; Shin, K.G., "Interleaved all-to-all reliable broadcast on meshes and hypercubes," Parallel and Distributed Systems, IEEE Transactions on, vol. 5, pp. 449-458, May 1994.

Wikipedia. "Depth-First Search" May 5, 2007. http://web.archive.org/web/20070505212029/http://en.wikipedia.org/wiki/Depth-first_Search.

Bruck J., et al. Efficient Algorithms for all-to-all communications in multiportmessage-passing systems, Parallel and Distributed Systems, IEEE Transactions on, vol. 8, Issue: 11, pp. 1143-1156, Nov. 1997.

Office Action Dated Mar. 4, 2008 in U.S. Appl. No. 11/279,620.

Office Action Dated Sep. 3, 2008 in U.S. Appl. No. 11/279,620.

Office Action Dated Dec. 29, 2008 in U.S. Appl. No. 11/279,620.

Office Action Dated Apr. 3, 2009 in U.S. Appl. No. 11/769,367.

Office Action Dated Dec. 13, 2007 in U.S. Appl. No. 11/459,387.

Office Action Dated Jul. 11, 2008 in U.S. Appl. No. 11/459,387.

Office Action Dated Mar. 18, 2009 in U.S. Appl. No. 11/459,387.

Office Action Dated Feb. 9, 2009 in U.S. Appl. No. 11/737,286.

Sistare, et al.; Optimization of MPI collectives on clusters of large-scale SMP's, Conference on High Performance Networking and Computing, Proceedings of the 1999 ACM/IEEE conference on Supercomputing; 1999.

Tanenbaum, Structured Computer Organization, Second Edition, Prentice-Hall, Inc., 1984.

Rosenberg; Dictionarty of Computers, Information Processing & Telecommunications, Second Edition, John Wiley & Sons, 1987.

* cited by examiner

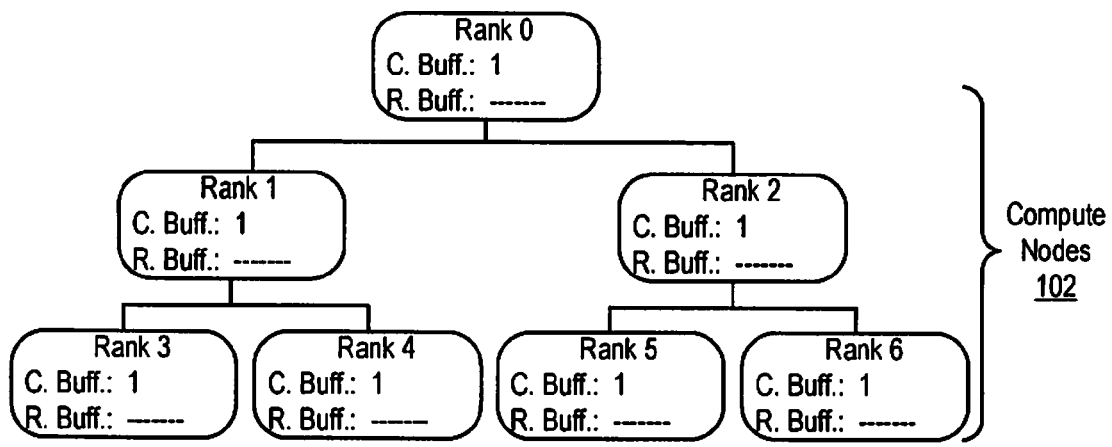
FIG. 7A: Beginning Buffer Status
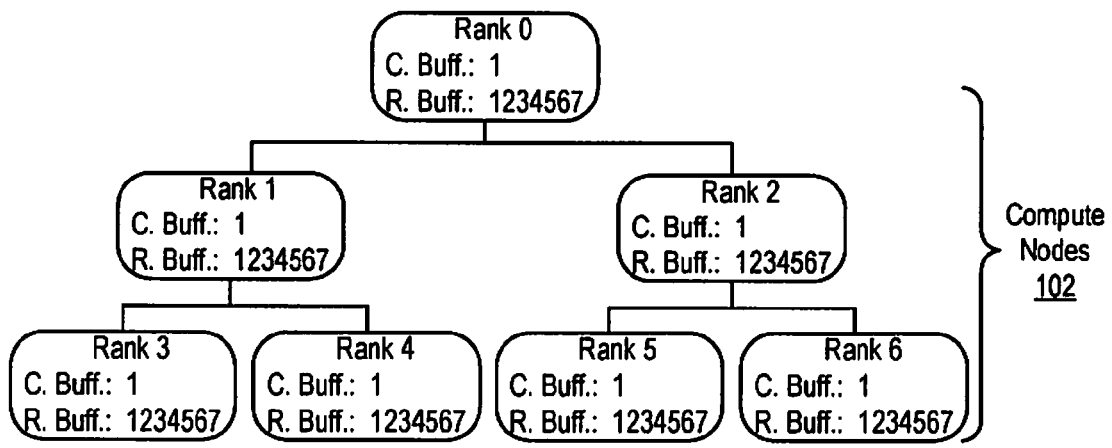
FIG. 7B: Buffer Status After Parallel-Prefix Broadcast

PARALLEL-PREFIX BROADCAST FOR A PARALLEL-PREFIX OPERATION ON A PARALLEL COMPUTER

BACKGROUND OF THE INVENTION

1. Field of the Invention

The field of the invention is data processing, or, more specifically, methods, apparatus, and products for parallel-prefix broadcast for a parallel-prefix operation on a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, a parallel-prefix operation. A parallel-prefix operation is an operation that applies a commutative binary operator 'θ', such as a bitwise OR, addition, or multiplication, to an n-element global array $\{v_0, v_1, v_2, \ldots, v_{n-1}\}$ to produce an n-element parallel-prefix results array $\{(v_0), (v_0 \; \theta \; v_1), (v_0 \; \theta \; v_1 \; \theta \; v_2), \ldots, (v_0 \; \theta \; v_1 \; \theta \; v_2 \; \theta \ldots \theta \; v_{n-1})\}$. The parallel-prefix results array generated using the parallel-prefix operation is important in many parallel algorithms such as, for example, a parallel quick sort. Because the elements of the global array used to generate the parallel-prefix results array are typically contained on a number of compute nodes and because thousands of nodes may participate in a parallel-prefix operation on a parallel computer, broadcasting the results of a parallel-prefix operation to each of the compute nodes in a parallel computer is always a challenge. If the group is large, and such groups may contain thousands of compute nodes, then the data communications cost of such an algorithm is substantial.

SUMMARY OF THE INVENTION

Methods, apparatus, and products are disclosed for a parallel-prefix broadcast for a parallel-prefix operation on a parallel computer, the parallel computer comprising a plurality of compute nodes, the compute nodes organized into at least one operational group of compute nodes for collective parallel operations of the parallel computer, each compute node in the operational group assigned a unique rank, and the operational group coupled for data communications through a global combining network. A parallel-prefix broadcast for a parallel-prefix operation on a parallel computer includes: configuring, on each ranked compute node, a parallel-prefix contribution buffer for storing the parallel-prefix contribution of the ranked compute node; configuring, on each ranked compute node, a parallel-prefix results buffer for storing results of a parallel-prefix operation, the parallel-prefix results buffer having a position for each compute node that corresponds to the rank of the compute node; repeatedly for each position in the parallel-prefix results buffer: processing in parallel by each ranked compute node in the operational group, including: determining, by the ranked compute node, whether the current position in the parallel-prefix results buffer is to include a contribution of the ranked compute node, if the current position in the parallel-prefix results buffer is not to include the contribution of the ranked compute node, contributing the identity element for the parallel-prefix operation, and if the current position in the parallel-prefix results buffer is to include the contribution of the ranked compute node, contributing the parallel-prefix contribution of the ranked compute node for the parallel-prefix operation, performing, by each ranked compute node, the parallel-prefix operation using the contributed identity elements and the contributed parallel-prefix contributions, yielding a result from the operation, and storing, by each ranked compute node, the result in the position in the parallel-prefix results buffer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIGS. 7A and 7B set forth block diagrams of the same organizational group of compute nodes illustrated at reference on FIG. 6.

DETAILED DESCRIPTION OF EXEMPLARY EMBODIMENTS

Figure 1:
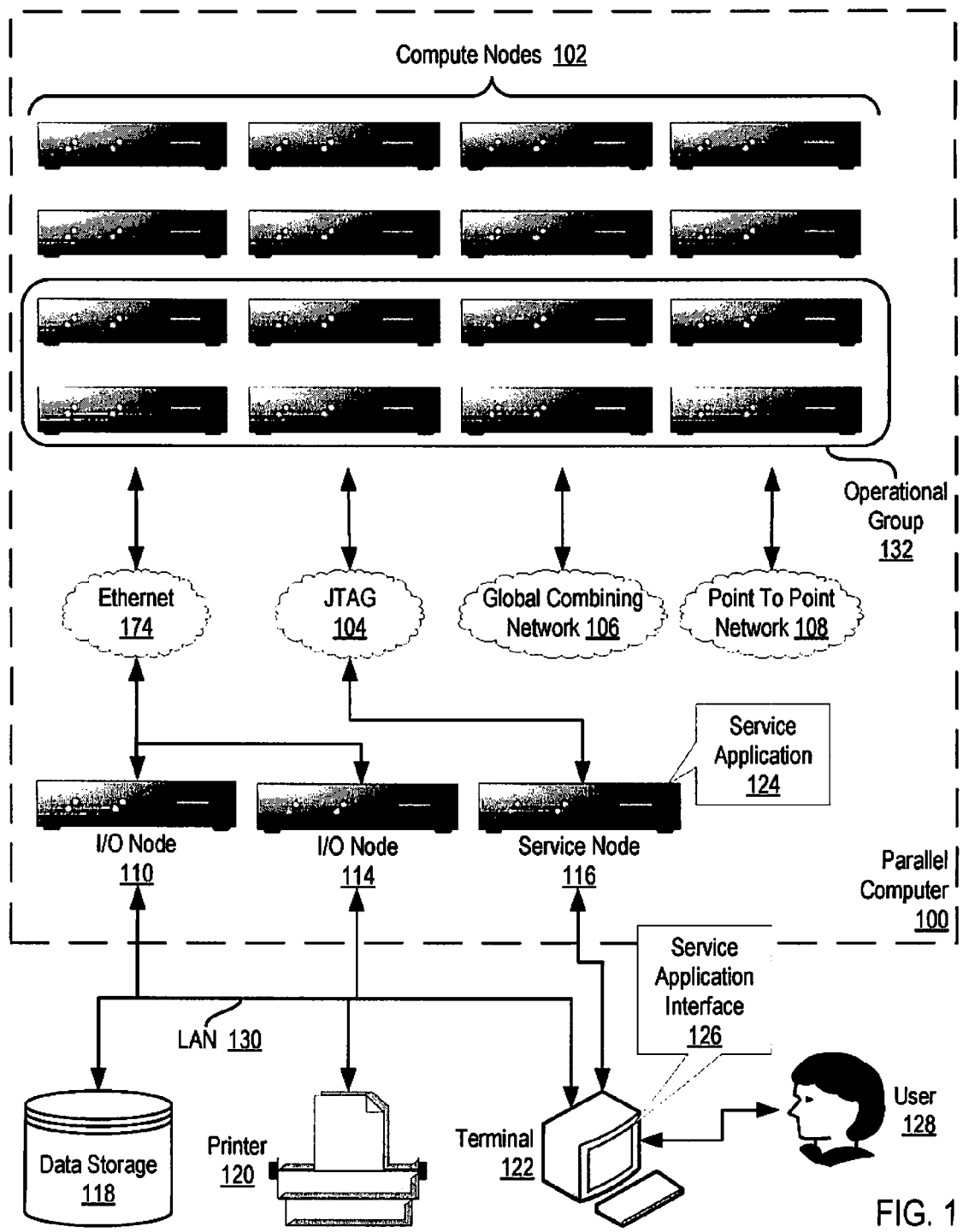
FIG. 1 illustrates an exemplary system for parallel-prefix broadcast for a parallel-prefix operation on a parallel computer according to embodiments of the present invention.

Exemplary methods, apparatus, and computer program products for parallel-prefix broadcast for a parallel-prefix operation on a parallel computer according to embodiments of the present invention are described with reference to the accompanying drawings, beginning with FIG. 1. FIG. 1 illustrates an exemplary system for parallel-prefix broadcast for a parallel-prefix operation on a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point to point network (108) which is optimized for point to point operations using a torus network topology. The global combining network (106) is a data communications network that includes data communications links connected to the compute nodes so as to organize the compute nodes as a binary tree. Each data communications network is implemented with data communications links among the compute nodes (102). The data communications links provide data communications for parallel operations among the compute nodes of the parallel computer.

In addition, the compute nodes (102) of the parallel computer (100) are organized into at least one operational group (132) of compute nodes for collective parallel operations on parallel computer (100). An operational group of compute nodes is the set of compute nodes upon which a collective parallel operation executes. Each compute node in the operational group assigned a unique rank that identifies the particular compute node in the operational group. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.' 'MPI' refers to 'Message Passing Interface,' a prior art parallel communications library, a module of computer program instructions for data communications on parallel computers. Examples of prior-art parallel communications libraries that may be improved for parallel-prefix broadcast for a parallel-prefix operation on a parallel computer according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

As described in more detail below in this specification, the system of FIG. 1 operates generally for a parallel-prefix broadcast for a parallel-prefix operation on a parallel computer according to embodiments of the present invention by: configuring, on each ranked compute node, a parallel-prefix contribution buffer for storing the parallel-prefix contribution of the ranked compute node; configuring, on each ranked compute node, a parallel-prefix results buffer for storing results of a parallel-prefix operation, the parallel-prefix results buffer having a position for each compute node that corresponds to the rank of the compute node; repeatedly for each position in the parallel-prefix results buffer: processing in parallel by each ranked compute node in the operational group: determining, by the ranked compute node, whether the current position in the parallel-prefix results buffer is to include a contribution of the ranked compute node, if the current position in the parallel-prefix results buffer is not to include the contribution of the ranked compute node, contributing the identity element for the operation, and if the current position in the parallel-prefix results buffer is to include the contribution of the ranked compute node, contributing the parallel-prefix contribution of the ranked compute node, performing, by each ranked compute node, the operation using the contributed identity elements and the contributed parallel-prefix contributions, yielding a result from the operation, and storing, by each ranked compute node, the result in the position in the parallel-prefix results buffer.

A parallel-prefix operation is an operation that applies a commutative binary operator 'θ', such as a bitwise OR, addition, or multiplication, to an n-element global array $\{v_0, v_1, v_2, \ldots, v_{n-1}\}$ to produce an n-element parallel-prefix results array $\{(v_0), (v_0 \theta v_1), (v_0 \theta v_1 \theta v_2), \ldots, (v_0 \theta v_1 \theta v_2 \theta \ldots \theta v_{n-1})\}$. Because each element of the global array is typically contributed by a different ranked compute of an operational group, each position in the results array stores the result of applying the parallel-prefix operation to the parallel-prefix contribution of one more ranked node than the previous position in the results array. For example, consider an operational group having three ranked nodes, each node contributing a value of '1,' and that the parallel-prefix operation specifies using a bitwise OR operator. The global array containing all the contributions from the nodes, therefore, is $\{1, 1, 1\}$. The parallel-prefix results array is $\{1, 2, 3\}$ because the first position merely contains value first position of the global array, the second position contains the result of applying the bitwise OR to the contributions of ranked nodes one and two in the first and second positions of the global array, and the third position contains the result of applying the bitwise OR to the contributions of ranked nodes one, two, and three in the first, second, and third positions of the global array.

A 'bitwise OR operation,' as the term is used in this specification, is an inclusive bitwise OR operation rather than an exclusive bitwise OR operation. The symbol for the inclusive bitwise OR function in the C and C++ programming languages is '|'. The inclusive bitwise OR function conducts a logical OR function separately on each bit of its operands. The effect is to turn bits on. For these operands, for example, x=00000000 00000001 00000000, in decimal, x=010, and y=00000000 00000000 00000010, in decimal, y=002, x=x|y yields x=00000000 00000001 00000010, in decimal, x=012. That is, all the bits that were on in each operand are also on in the result of the bitwise OR function.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group. In scatter operation, all processes typically specify the same receive count. The send arguments are only significant to the root process, whose buffer actually contains sendcount * N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, computer (100) includes input/output ('I/O') nodes (110, 114) coupled to compute nodes (102) through the data communications network (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The arrangement of nodes, networks, and I/O devices making up the exemplary system illustrated in FIG. 1 are for explanation only, not for limitation of the present invention. Data processing systems capable of parallel-prefix broadcast for a parallel-prefix operation on a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of executing a parallel-prefix broadcast for a parallel-prefix operation on a parallel computer according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Executing a parallel-prefix broadcast for an operation according to embodiments of the present invention is generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of a parallel-prefix broadcast for a parallel-prefix operation on a parallel computer according to embodiments of the present invention. The compute node (152) of FIG. 2 includes a plurality of computer processors (164) as well as random access memory ('RAM') (156). Processors (164) are connected to RAM (156) through a high-speed memory bus (154) and through a bus adapter (194) and an extension bus (168) to other components of the compute node. Stored in RAM (156) is an application program (158), a module of computer program instructions that carries out parallel, user-level data processing using parallel algorithms.

Also stored RAM (156) is a parallel communications library (160), a library of computer program instructions that carry out parallel communications among compute nodes, including point to point operations as well as collective operations. Application program (158) executes collective operations by calling software routines in parallel communications library (160). A library of parallel communications routines may be developed from scratch for use in a parallel-prefix broadcast for a parallel-prefix operation on a parallel computer according to embodiments of the present invention, using a traditional programming language such as the C programming language, and using traditional programming methods to write parallel communications routines that send and receive data among nodes on two independent data communications networks. Alternatively, existing prior art libraries may be improved according to embodiments of the present invention. Examples of prior-art parallel communications libraries that may be improved for a parallel-prefix broadcast for a parallel-prefix operation on a parallel computer according to embodiments of the present invention include the 'Message Passing Interface' ('MPI') library and the 'Parallel Virtual Machine' ('PVM') library. However it is developed, the parallel communications routines of parallel communication library (160) are improved to execute a parallel-prefix broadcast for a parallel-prefix operation on a parallel computer according to embodiments of the present invention by: configuring, on each ranked compute node, a parallel-prefix contribution buffer for storing the parallel-prefix contribution of the ranked compute node; configuring, on each ranked compute node, a parallel-prefix results buffer for storing results of a parallel-prefix operation, the parallel-prefix results buffer having a position for each compute node that corresponds to the rank of the compute node; repeatedly for each position in the parallel-prefix results buffer: processing in parallel by each ranked compute node in the operational group: determining, by the ranked compute node, whether the current position in the parallel-prefix results buffer is to include a contribution of the ranked compute node, if the current position in the parallel-prefix results buffer is not to include the contribution of the ranked compute node, contributing the identity element for the operation, and if the current position in the parallel-prefix results buffer is to include the contribution of the ranked compute node, contributing the parallel-prefix contribution of the ranked compute node, performing, by each ranked compute node, the operation using the contributed identity elements and the contributed parallel-prefix contributions, yielding a result from the operation, and storing, by each ranked compute node, the result in the position in the parallel-prefix results buffer.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
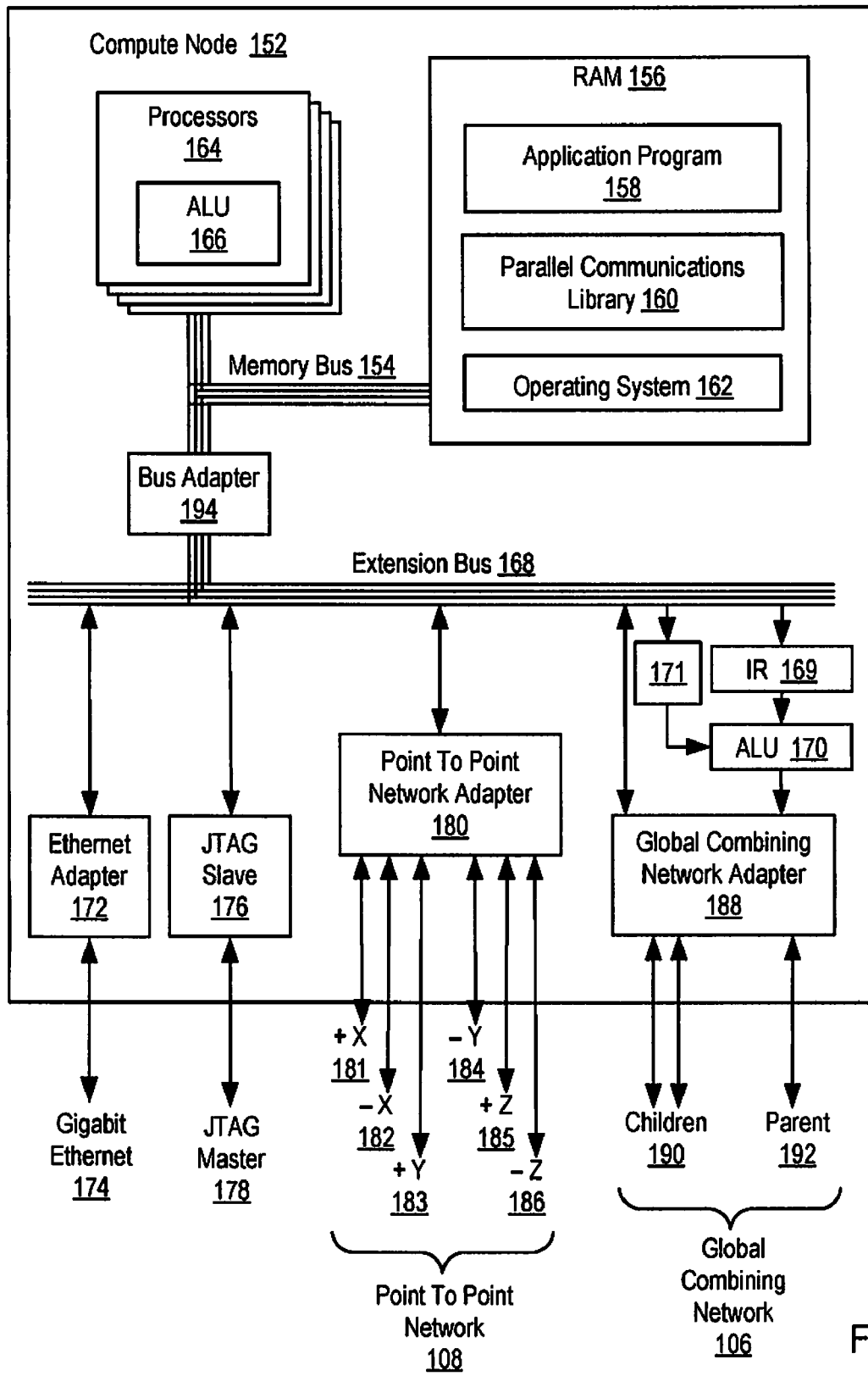
FIG. 2 sets forth a block diagram of an exemplary compute node useful in a parallel computer capable of a parallel-prefix broadcast for a parallel-prefix operation on a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that execute a parallel-prefix broadcast for a parallel-prefix operation on a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in executing a parallel-prefix broadcast for a parallel-prefix operation on a parallel computer according to embodiments of the present invention.

The data communications adapters in the example of FIG. 2 include a Point To Point Network Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), -x (182), +y (183), -y (184), +z (185), and -z (186).

The data communications adapters in the example of FIG. 2 include a Global Combining Network Adapter (188) that couples example compute node (152) for data communications to a network (106) that is optimal for collective message passing operations such as, for example, a network configured as a binary tree. Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, collective operations adapter (188) may execute the arithmetic or logical operation by use of ALU (166) in processor (164) or, typically much faster, by use dedicated ALU (170) using data provided by the nodes (190, 192) on the global combining network (106) and data provided by a processor (164) on the compute node (152). In such a manner, computer program instructions in the parallel communications library (160) may configure the ALU (170) of the adapter (188) in dependence upon a commutative binary operator specified by parallel-prefix operation. The compute node (152) may then perform the parallel-prefix operation with the ALU (170) on a global combining network adapter (188) for the global combing network (106) using data provided by the children (190) and the compute node (152) itself. The ALU output may then be passed up to the parent (192).

Often when performing arithmetic operations, including parallel-prefix operations, in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processors (162) on the compute node (152) contribute data that alters the output of ALU (170) that is passed up or down the global combining network (106). Because the ALU (170) typically does not output any data onto the network (106) until the ALU (170) receives input from a processor (164), a processor (164) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (152) includes dedicated hardware (171) for injecting identity elements into the ALU (170) to reduce the amount of processor resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
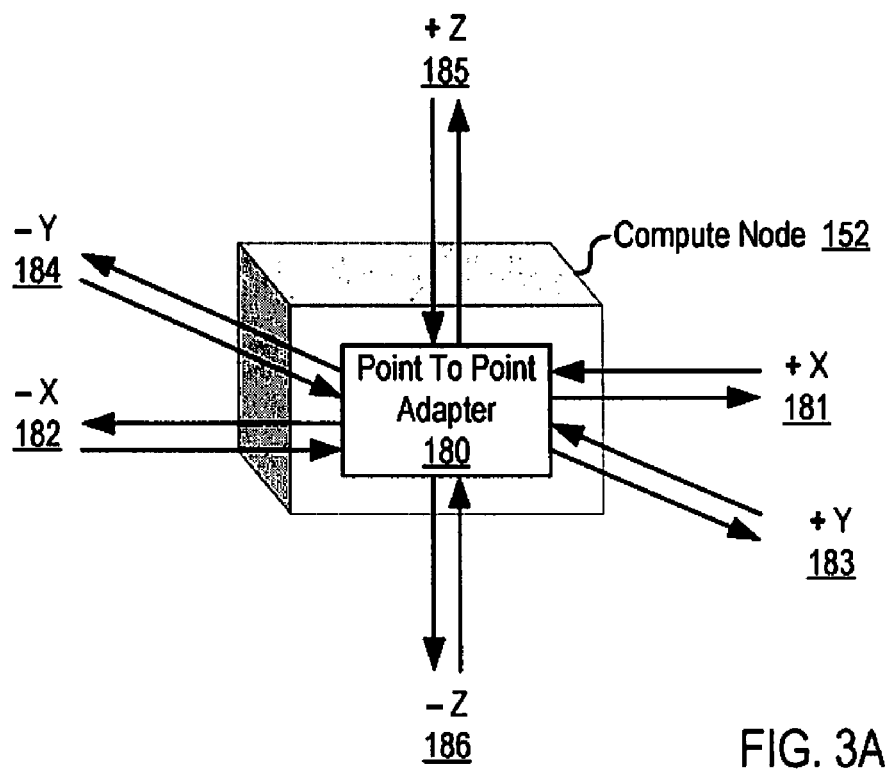
FIG. 3A illustrates a block diagram of an exemplary Point To Point Adapter useful in systems that execute a parallel-prefix broadcast for a parallel-prefix operation on a parallel computer according to embodiments of the present invention.

For further explanation, FIG. 3A illustrates a block diagram of an exemplary Point To Point Adapter useful in systems that execute a parallel-prefix broadcast for a parallel-prefix operation on a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 3B:
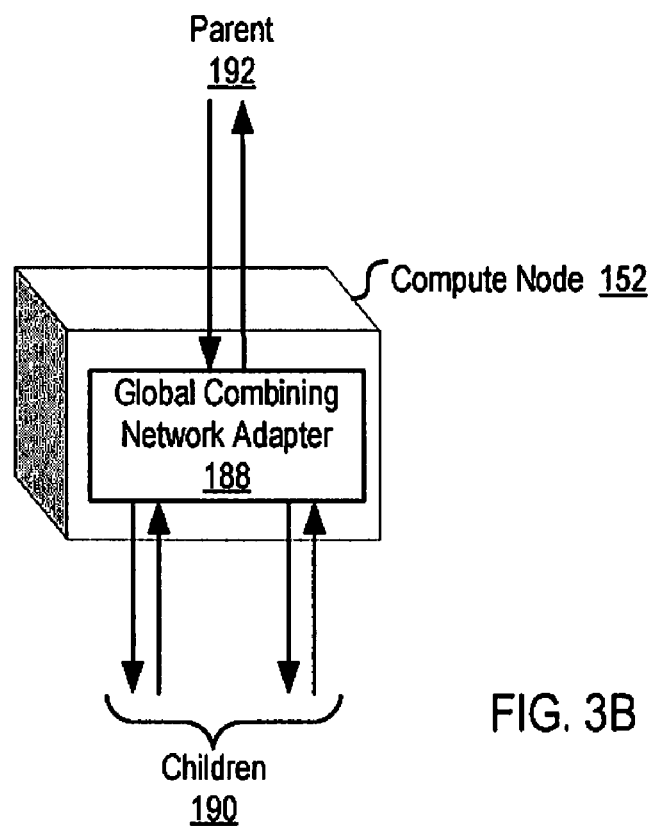
FIG. 3B illustrates a block diagram of an exemplary Global Combining Network Adapter useful in systems that a parallel-prefix broadcast for a parallel-prefix operation on a parallel computer according to embodiments of the present invention.

For further explanation, FIG. 3B illustrates a block diagram of an exemplary Global Combining Network Adapter useful in systems that a parallel-prefix broadcast for a parallel-prefix operation on a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
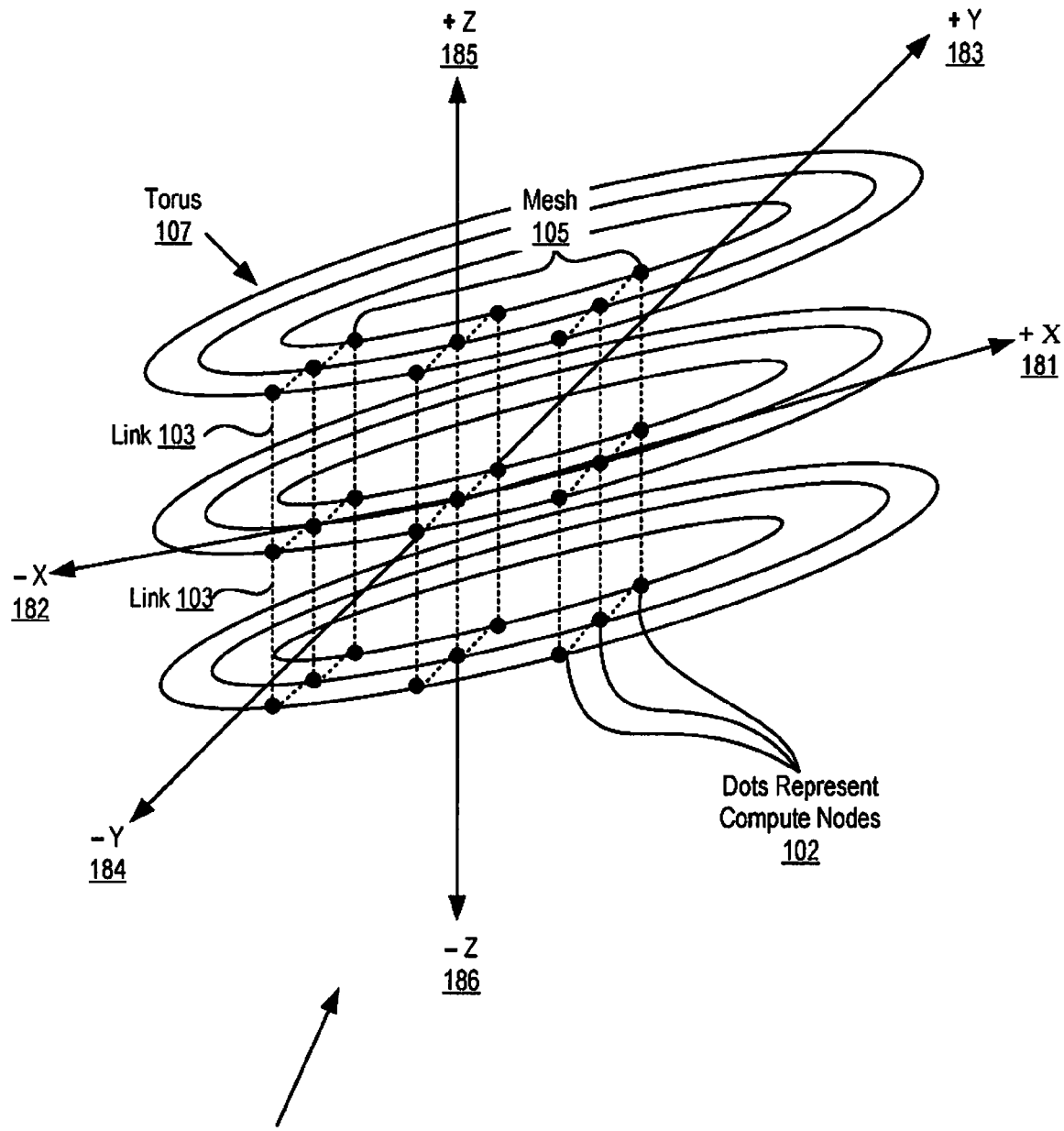
FIG. 4 sets forth a line drawing illustrating an exemplary data communications network optimized for point to point operations useful in systems that execute a parallel-prefix broadcast for a parallel-prefix operation on a parallel computer according to embodiments of the present invention.

For further explanation, FIG. 4 sets forth a line drawing illustrating an exemplary data communications network optimized for point to point operations useful in systems that execute a parallel-prefix broadcast for a parallel-prefix operation on a parallel computer according to embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in a parallel-prefix broadcast for a parallel-prefix operation on a parallel computer accordance with embodiments of the present invention may contain only a few compute nodes or may contain thousands of compute nodes.

Figure 5:
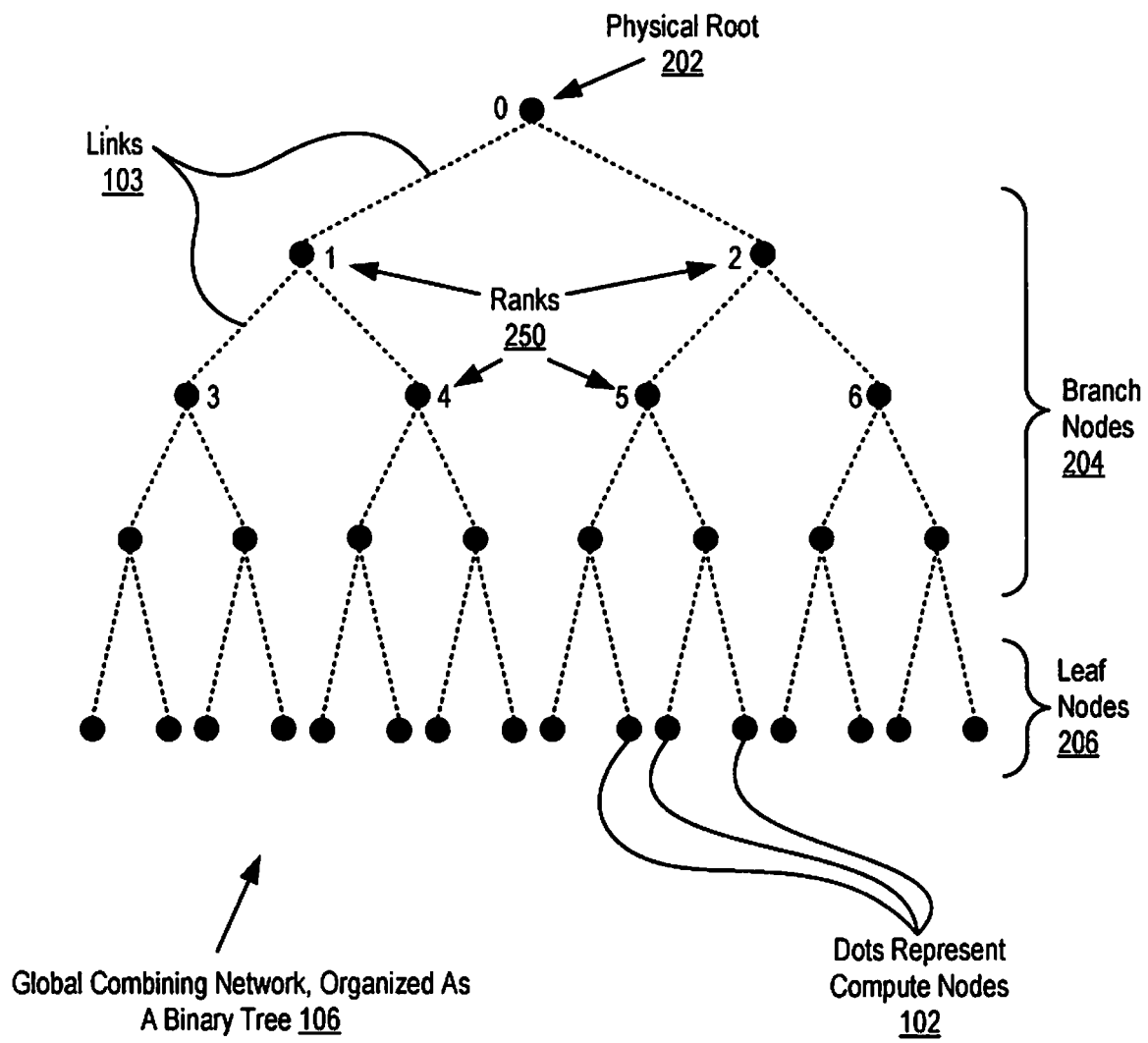
FIG. 5 sets forth a line drawing illustrating an exemplary global combining network useful in systems that execute a parallel-prefix broadcast for a parallel-prefix operation on a parallel computer according to embodiments of the present invention.

For further explanation, FIG. 5 sets forth a line drawing illustrating an exemplary global combining network useful in systems that execute a parallel-prefix broadcast for a parallel-prefix operation on a parallel computer according to embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network may be characterized as a physical root node (202), branch nodes (204), and leaf nodes (206). The physical root (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network optimized for collective operations for use in executing a parallel-prefix broadcast for a parallel-prefix operation on a parallel computer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

In the example of FIG. 5, the global combining network (106) provides data communications among all the nodes (102) in the binary tree to effect parallel reduction operations useful for a parallel-prefix broadcast for a parallel-prefix operation according to embodiments of the present invention. Each ranked node is configured with a parallel-prefix contribution buffer for storing the parallel-prefix contribution of the ranked compute node and configured with a parallel-prefix results buffer for storing results of a parallel-prefix operation. Each parallel-prefix results buffer has a position for each compute node that corresponds to the rank of the compute node. For each position in the results buffer, all the ranked nodes (102) contribute data to the global combining network (106)—either the node's contribution from the contribution buffer or the identity element, depending on the current position of the results buffer being processed by the nodes (102) of the network (106). Each node performs the parallel-prefix operation using the node's contribution and the contributions from the child nodes below that node. That node then passes the result of the parallel-prefix operation up to that node's parent node. In such a manner, all the results cascade up to the physical root node (202) into a final result for the entire operation across all the nodes of the tree. Upon the results reaching the physical root node (202), the physical root (202) sends the result of the entire operation back down the tree to each compute node (102) for storage in the compute node's parallel-prefix result buffer.

Figure 6:
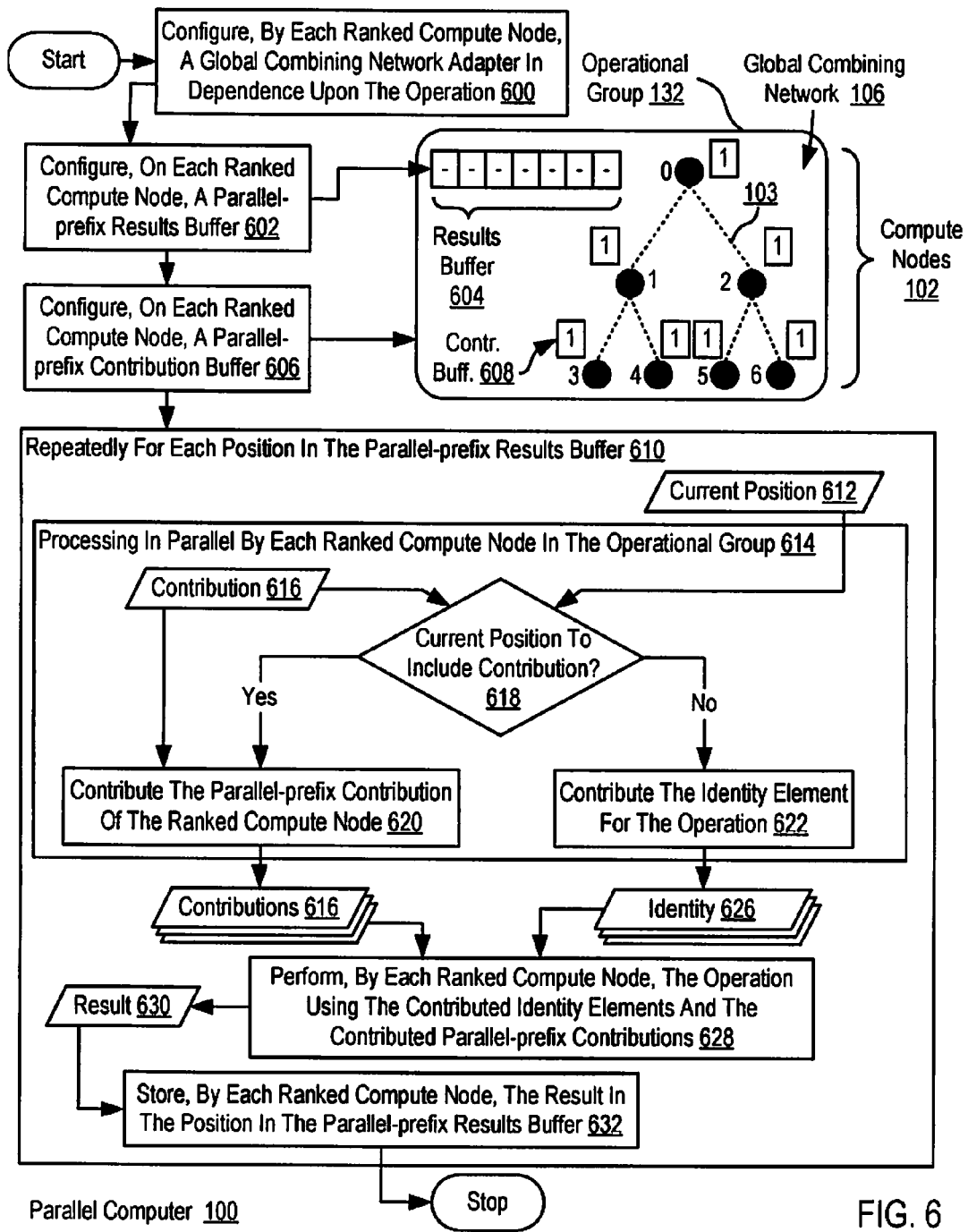
FIG. 6 sets forth a flow chart illustrating an exemplary method of parallel-prefix broadcast for a parallel-prefix operation on a parallel computer according to embodiments of the present invention.

For further explanation, FIG. 6 sets forth a flow chart illustrating an exemplary method of parallel-prefix broadcast for a parallel-prefix operation on a parallel computer according to embodiments of the present invention. The parallel computer includes a plurality of compute nodes (102), represented here by black dots in global combining network (106). The compute nodes (102) of the operational group (132) are coupled for data communications through a global combining network (106). The global combining network (106) is a data communications network of parallel computer (100) that includes data communications links (103) connected to the compute nodes so as to organize the compute nodes as a binary tree. In this example, the data communications links (103) are represented by dotted lines connecting the dots that represent the compute nodes (102). In additional, in this example, each compute node has a separate ALU dedicated to parallel reduce operations. The separate, dedicated ALUs are not shown in FIG. 6, but they are of the kind illustrated and described above regarding reference (170) on FIG. 2.

In addition to their organization as a binary tree, the compute nodes (102) of parallel computer (100) are organized into an operational group (132) of compute nodes for collective parallel operations on parallel computer (100), and each compute node in the operational group is assigned a unique rank. The ranks are shown here as integers immediately adjacent to each computer node in operational group (132). The ranks in this example are assigned as a sequence of integers beginning with 0 assigned to the physical root node, 1 assigned to the first node in the second layer of the tree, 2 assigned to the second node in the second layer of the tree, 3 assigned to the first node in the third layer of the tree, and so on.

The method of FIG. 6 starts when each compute node (102) calls a parallel-prefix operation to be performed on the parallel computer. Each compute node (102) may call a parallel-prefix operation using a function from a parallel communication library installed on each compute node (102) such as, for example, a version of MPI_SCAN improved according to embodiments of the present invention. The parallel-prefix operation typically specifies a commutative binary operator to be applied to the contributions provided by each compute node (102) of the operational group (132). Such a commutative binary operator may include, for example, a bitwise OR, addition, multiplication, or any other commutative binary operator as will occur to those of skill in the art.

The method of FIG. 6 includes configuring (600), by each ranked compute node, a global combining network adapter for the global combining network in dependence upon the parallel-prefix operation. Each compute node (102) may configure (600) a global combining network adapter in dependence upon the parallel-prefix operation according to the method of FIG. 6 by writing configuration data to registers in the global combining network adapter through an application programming interface ('API') of the global combining network adapter. Such configuration data may configure the ALU in each adapter to perform the parallel-prefix operation using the specified commutative binary operator. Consider, for example, that the parallel-prefix operation specifies performing the operation with a bitwise OR. Readers will recall that the symbol for the inclusive bitwise OR function in the C and C++ programming languages is '|'. The bitwise OR operator conducts a logical OR function separately on each bit of its operands. The effect is to turn bits on. For these operands, for example, x=00000000 00000001 00000000, in decimal, x=010, and
y=00000000 00000000 00000010, in decimal, y=002, x=x|y yields x=00000000 00000001 00000010, in decimal, x=012. That is, all the bits that were on in each operand are also on in the result of the bitwise OR function.

The method of FIG. 6 includes configuring (602), on each ranked compute node, a parallel-prefix results buffer (604) for storing results of a parallel-prefix operation. The parallel-prefix results buffer (604) of FIG. 6 on each ranked compute node has a position for each compute node that corresponds to the rank of the compute node. For example, in the exemplary results buffer (604) of FIG. 6, the leftmost position in the results buffer (604) corresponds to the node having a rank of '0,' the next position to the right in the buffer corresponds to the node having a rank of '1,' the next position to the right in the buffer corresponds to the node having a rank of '2,' the next position to the right in the buffer corresponds to the node having a rank of '3,' and so on. When the results buffer (604) is initially configured, the buffer (604) does not contain any data, which is indicated by the dashes in the results buffer (604). Although FIG. 6 only illustrates one parallel-prefix results buffer, readers will note that each ranked node (102) is configured with such a parallel-prefix results buffer.

The method of FIG. 6 includes configuring (606), on each ranked compute node, a parallel-prefix contribution buffer (608) for storing the parallel-prefix contribution of the ranked compute node. The parallel-prefix contribution of each ranked node is the values from one or more elements of a global array whose elements are distributed across the nodes (102) of the operational group (132). Such a global array may be used by a parallel algorithm in collective operations such as, for example, reduce, allreduce, gather, allgather, and so on. In the example of FIG. 6, each ranked node is configured with a parallel-prefix contribution buffer (608) that stores a parallel-prefix contribution '1.'

The method of FIG. 6 continues repeatedly (610) for each position in the parallel-prefix results buffer (604) as follows:
  processing (614) in parallel by each ranked compute node in the operational group (132), including:
    determining (618), by the ranked compute node, whether the current position (612) in the parallel-prefix results buffer (604) is to include a contribution (616) of the ranked compute node,
    if the current position (612) in the parallel-prefix results buffer (604) is not to include the contribution (616) of the ranked compute node, contributing (626) the identity element for the operation, and
    if the current position (612) in the parallel-prefix results buffer (604) is to include the contribution (616) of the ranked compute node, contributing (620) the parallel-prefix contribution (616) of the ranked compute node;
  performing (628), by each ranked compute node, the parallel-prefix operation using the contributed identity elements (626) and the contributed parallel-prefix contributions (616), yielding a result (630) from the operation; and
  storing (632), by each ranked compute node, the result (630) in the position in the parallel-prefix results buffer (604).

Turning now to each step carried out repeatedly (610) for each position in the parallel-prefix results buffer: each ranked compute node (102) of the operational group (132) processes (614) in parallel by determining (618), by the ranked compute node, whether the current position (612) in the parallel-prefix results buffer (604) is to include a contribution (616) of the ranked compute node. The manner in which the ranked compute node determines (618) whether the current position (612) in the parallel-prefix results buffer (604) is to include a contribution (616) of the ranked compute node may vary depending on the numbering of the compute node ranks and the positions in the results buffer (604), along with the relationship between each rank and each position in the buffer (604). Each compute node may maintain the current position (612) of the results buffer (604) using a position counter that is initialized when the compute node call the parallel-prefix operation.

When the lowest rank in the operational group is zero and the position of the results buffer corresponding to rank zero is the first position, the ranked node (102) may determine (618) whether the current position (612) in the parallel-prefix results buffer (604) is to include a contribution (616) of the ranked compute node (102) according to the method of FIG. 6 by determining whether the current position (612) of the parallel prefix results buffer (608) is greater than the rank of the compute node. If the current position (612) of the parallel prefix results buffer (608) is greater than the rank of the compute node, then the current position (612) in the parallel-prefix results buffer (604) is to include a contribution (616) of the ranked compute node. If the current position (612) of the parallel prefix results buffer (608) is not greater than the rank of the compute node, then the current position (612) in the parallel-prefix results buffer (604) is to include a contribution (616) of the ranked compute node.

When the lowest rank in the operational group is one and the position of the results buffer corresponding to rank one is the first position, the ranked node (102) may determine (618) whether the current position (612) in the parallel-prefix results buffer (604) is to include a contribution (616) of the ranked compute node (102) according to the method of FIG. 6 by determining whether the current position (612) of the parallel prefix results buffer (608) is greater than or equal to the rank of the compute node (102). If the current position (612) of the parallel prefix results buffer (608) is greater than or equal to the rank of the compute node (102), then the current position (612) in the parallel-prefix results buffer (604) is to include the contribution (616) of the ranked compute node (102). If the current position (612) of the parallel prefix results buffer (608) is greater than or equal to the rank of the compute node (102), then the current position (612) in the parallel-prefix results buffer (604) is to include the contribution (616) of the ranked compute node (102).

In the method of FIG. 6, each ranked compute node (102) of the operational group (132) continues to process (614) in parallel by contributing (622) the identity element (626) for the operation if the current position (612) in the parallel-prefix results buffer (604) is not to include the contribution (616) of the ranked compute node. The identity element is an element of a set that, when combined with any other element of the set using a particular binary operation, leaves the other elements of the set unchanged. Consider, for example, the binary operation of addition, which has a corresponding identity element of '0.' Combining any number in a set of real numbers with '0' using the addition operation does not change the number. Similarly, consider, for example, the binary operation of multiplication, which has a corresponding identity element of '1.' Combining any number in a set of real numbers with '1' using the multiplication operation does not change the number. Similarly, consider, for example, the binary operation of a bitwise OR, which has a corresponding identity element of '0.' Combining any binary number in a set of real binary numbers with '0' using the bitwise OR operation does not change the number. Each ranked compute node (102) may contribute (622) the identity element (626) for the operation according to the method of FIG. 6 by injecting the identity element (626) from dedicated hardware of the compute node.

In the method of FIG. 6, each ranked compute node (102) of the operational group (132) also continues to process (614) in parallel by contributing (620) the parallel-prefix contribution (616) of the ranked compute node for the parallel-prefix operation if the current position (612) in the parallel-prefix results buffer (604) is to include the contribution (616) of the ranked compute node. In the example of FIG. 6, each node that is to include the contribution (616) for the parallel-prefix operation contributes a value of '1' for the parallel-prefix operation.

The method of FIG. 6 also includes performing (628), by each ranked compute node, the parallel-prefix operation using the contributed identity elements (626) and the contributed parallel-prefix contributions (616), yielding a result (630) from the operation, repeatedly (610) for each position in the parallel-prefix results buffer (604). Each ranked compute node may perform (628) the parallel-prefix operation according to the method of FIG. 6 by performing the parallel-prefix operation with an arithmetic logic unit ('ALU') of a global combining network adapter for the global combing network (106). The ALU of the global combining network adapter for each ranked node (102) may perform the parallel-prefix operation by applying the commutative binary operator to the data injected by the node—whether that data is the node's parallel-prefix contribution (616) or the identity element (626)—and to the data received from any child nodes on the tree (106). The ALU of the global combining network adapter for each ranked node (102) may then pass the result of the parallel-prefix operation to that node's parent node on the tree (106). In such a manner, the physical root node of the operational group (132) receives the result (630) for the current position (612) of the results buffer (604) and transmits the entire result (630) down the tree (106) to each ranked compute node (102).

The method of FIG. 6 includes storing (632), by each ranked compute node, the result (630) in the position in the parallel-prefix results buffer (604), repeatedly (610) for each position in the parallel-prefix results buffer (604). Each ranked compute node may store (632) the result (630) in the position in the parallel-prefix results buffer (604) according to the method of FIG. 6 by retrieving the result (630) from a FIFO reception stack for the global combining network adapter installed in the compute node.

After performing the steps (614, 628, 632) described above repeatedly (610) for each position in the send buffer (602), the parallel-prefix broadcast for a parallel-prefix operation is complete. Each compute node (102) now contains a parallel-prefix results buffer (604) the stores the results of the parallel-prefix operation. For further explanation, FIGS. 7A and 7B set forth block diagrams of the same organizational group of compute nodes (102) illustrated at reference (132) on FIG. 6. Read together, FIGS. 7A and 7B illustrate a sequence of execution of the method of FIG. 6 with changes in buffer status.

FIG. 7A illustrates the status of the memory buffers in each compute node (102) of the operational group just after configuring the parallel-prefix contribution buffer and the parallel-prefix results buffer in steps (602, 606) of the method of FIG. 6. In the example of FIG. 7A, each parallel-prefix contribution buffer is large enough to store a contribution of '1.' Each parallel-prefix results buffer has seven position, each position for one of the compute nodes (102) and corresponds to the rank of the compute node. For example, in the exemplary results buffer of FIG. 7A, the leftmost position in each results buffer corresponds to the node having a rank of '0,' the next position to the right in each results buffer corresponds to the node having a rank of '1,' the next position to the right in each results buffer corresponds to the node having a rank of '2,' the next position to the right in each results buffer corresponds to the node having a rank of '3,' and so on. When the results buffers are initially configured, each results buffer typically does not contain any data, which is indicated by the dashes in each parallel-prefix results buffer.

FIG. 7B illustrates the status of the memory buffers in each compute node (102) of the operational group just after a parallel-prefix broadcast according to the method of FIG. 6 when the exemplary parallel-prefix operation specifies using addition operator as the commutative binary operator. For the first position in the results buffer, the node having rank zero contributes its parallel-prefix contribution value of '1' and the other node contribute the identity elements of '0.' Each compute node performs the parallel-prefix operation using the contributed parallel-prefix contribution value of '1' and the contributed identity elements of '0,' yielding a result of '1' in the physical root node having a rank of zero. The physical root node having a rank of zero then transmits the result of '1' down the binary tree to all the compute nodes (102), which in turn store the value of '1' in the first position of the parallel-prefix results buffer. For the second position in the results buffer, the nodes having rank zero and one contribute their parallel-prefix contribution values of '1' and the other node contribute the identity elements of '0.' Each compute node performs the parallel-prefix operation using the contributed parallel-prefix contribution values of '1' and the contributed identity elements of '0,' yielding a result of '2' in the physical root node having a rank of zero. The physical root node having a rank of zero then transmits the result of '2' down the binary tree to all the compute nodes (102), which in turn store the value of '2' in the second position of the parallel-prefix results buffer. For the third position in the results buffer, the nodes having rank zero, one, and two contribute their parallel-prefix contribution values of '1' and the other node contribute the identity elements of '0.' Each compute node performs the parallel-prefix operation using the contributed parallel-prefix contribution values of '1' and the contributed identity elements of '0,' yielding a result of '3' in the physical root node having a rank of zero. The physical root node having a rank of zero then transmits the result of '3' down the binary tree to all the compute nodes (102), which in turn store the value of '3' in the third position of the parallel-prefix results buffer. This process continues for each of the remaining positions in the parallel-prefix results buffer.

Exemplary embodiments of the present invention are described largely in the context of a fully functional computer system for parallel-prefix broadcast for a parallel-prefix operation on a parallel computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for parallel-prefix broadcast for a parallel-prefix operation on a parallel computer, the parallel computer comprising a plurality of compute nodes, the plurality of compute nodes organized into at least one operational group of compute nodes for collective parallel operations of the parallel computer, each compute node in the at least one operational group assigned a unique rank, and the at least one operational group coupled for data communications through a global combining network, the method comprising:

configuring, on each ranked compute node, a parallel-prefix contribution buffer for storing a parallel-prefix contribution of the ranked compute node;

configuring, on each ranked compute node, a parallel-prefix results buffer for storing results of a parallel-prefix operation, the parallel-prefix results buffer having a position for each compute node that corresponds to the rank of the compute node; and repeatedly for each position in the parallel-prefix results buffer:

processing in parallel by each ranked compute node in the at least one operational group, including:

determining, by the ranked compute node, whether a current position in the parallel-prefix results buffer is to include a contribution of the ranked compute node, if the current position in the parallel-prefix results buffer is not to include the contribution of the ranked compute node, contributing an identity element for the parallel-prefix operation, and if the current position in the parallel-prefix results buffer is to include the contribution of the ranked compute node, contributing the parallel-prefix contribution of the ranked compute node for the parallel-prefix operation, performing, by each ranked compute node, the parallel-prefix operation using the contributed identity elements and the contributed parallel-prefix contributions, yielding a result from the parallel-prefix operation, and storing, by each ranked compute node, the result in the position in the parallel-prefix results buffer.

2. The method of claim 1 wherein determining, by the ranked compute node, whether the current position in the parallel-prefix results buffer is to not include a contribution by the compute node further comprises determining whether the current position of the parallel prefix results buffer is greater than the rank of the compute node.

3. The method of claim 1 wherein determining, by the ranked compute node, whether the current position in the parallel-prefix results buffer is to include a contribution by the compute node further comprises determining whether the current position of the parallel prefix results buffer is greater than or equal to the rank of the compute node.

4. The method of claim 1 wherein performing, by each ranked compute node, the parallel-prefix operation using the contributed identity elements and the contributed parallel-prefix contributions, yielding a result from the parallel-prefix operation further comprises performing the parallel-prefix operation with an arithmetic logic unit ('ALU') of a global combining network adapter for the global combing network.

5. The method of claim 1 wherein contributing the identity element for the parallel-prefix operation further comprises injecting the identity element from dedicated hardware of the compute node.

6. The method of claim 1 further comprising configuring, by each ranked compute node, a global combining network adapter for the global combining network in dependence upon the parallel-prefix operation.

7. A parallel computer for parallel-prefix broadcast for a parallel-prefix operation on a parallel computer, the parallel computer comprising a plurality of compute nodes, the plurality of compute nodes organized into at least one operational group of compute nodes for collective parallel operations of the parallel computer, each compute node in the at least one operational group assigned a unique rank, and the at least one operational group coupled for data communications through a global combining network, the parallel computer comprising computer processors, computer memory operatively coupled to the computer processors, the computer memory having disposed within it computer program instructions capable of:

configuring, on each ranked compute node, a parallel-prefix contribution buffer for storing a parallel-prefix contribution of the ranked compute node;

configuring, on each ranked compute node, a parallel-prefix results buffer for storing results of a parallel-prefix operation, the parallel-prefix results buffer having a position for each compute node that corresponds to the rank of the compute node; and repeatedly for each position in the parallel-prefix results buffer:

processing in parallel by each ranked compute node in the at least one operational group, including:

determining, by the ranked compute node, whether a current position in the parallel-prefix results buffer is to include a contribution of the ranked compute node, if the current position in the parallel-prefix results buffer is not to include the contribution of the ranked compute node, contributing an identity element for the parallel-prefix operation, and if the current position in the parallel-prefix results buffer is to include the contribution of the ranked compute node, contributing the parallel-prefix contribution of the ranked compute node for the parallel-prefix operation, performing, by each ranked compute node, the parallel-prefix operation using the contributed identity elements and the contributed parallel-prefix contributions, yielding a result from the parallel-prefix operation, and storing, by each ranked compute node, the result in the position in the parallel-prefix results buffer.

8. The parallel computer of claim 7 wherein determining, by the ranked compute node, whether the current position in the parallel-prefix results buffer is to not include a contribution by the compute node further comprises determining whether the current position of the parallel prefix results buffer is greater than the rank of the compute node.

9. The parallel computer of claim 7 wherein determining, by the ranked compute node, whether the current position in the parallel-prefix results buffer is to include a contribution by the compute node further comprises determining whether the current position of the parallel prefix results buffer is greater than or equal to the rank of the compute node.

10. The parallel computer of claim 7 wherein performing, by each ranked compute node, the parallel-prefix operation using the contributed identity elements and the contributed parallel-prefix contributions, yielding a result from the parallel-prefix operation further comprises performing the parallel-prefix operation with an arithmetic logic unit ('ALU') of a global combining network adapter for the global combing network.

11. The parallel computer of claim 7 wherein contributing the identity element for the parallel-prefix operation further comprises injecting the identity element from dedicated hardware of the compute node.

12. The parallel computer of claim 7 wherein the computer memory also has disposed within it computer program instructions capable of configuring, by each ranked compute node, a global combining network adapter for the global combining network in dependence upon the parallel-prefix operation.

13. A computer program product for parallel-prefix broadcast for a parallel-prefix operation on a parallel computer, the parallel computer comprising a plurality of compute nodes, the plurality of compute nodes organized into at least one operational group of compute nodes for collective parallel operations of the parallel computer, each compute node in the at least one operational group assigned a unique rank, and the at least one operational group coupled for data communications through a global combining network, the computer program product disposed upon a signal bearing recordable medium, the computer program product comprising computer program instructions capable of:

configuring, on each ranked compute node, a parallel-prefix contribution buffer for storing a parallel-prefix contribution of the ranked compute node;

configuring, on each ranked compute node, a parallel-prefix results buffer for storing results of a parallel-prefix operation, the parallel-prefix results buffer having a position for each compute node that corresponds to the rank of the compute node; and repeatedly for each position in the parallel-prefix results buffer:

processing in parallel by each ranked compute node in the at least one operational group, including:

determining, by the ranked compute node, whether a current position in the parallel-prefix results buffer is to include a contribution of the ranked compute node, if the current position in the parallel-prefix results buffer is not to include the contribution of the ranked compute node, contributing an identity element for the parallel-prefix operation, and if the current position in the parallel-prefix results buffer is to include the contribution of the ranked compute node, contributing the parallel-prefix contribution of the ranked compute node for the parallel-prefix operation, performing, by each ranked compute node, the parallel-prefix operation using the contributed identity elements and the contributed parallel-prefix contributions, yielding a result from the parallel-prefix operation, and storing, by each ranked compute node, the result in the position in the parallel-prefix results buffer.

14. The computer program product of claim 13 wherein determining, by the ranked compute node, whether the current position in the parallel-prefix results buffer is to not include a contribution by the compute node further comprises determining whether the current position of the parallel prefix results buffer is greater than the rank of the compute node.

15. The computer program product of claim 13 wherein determining, by the ranked compute node, whether the current position in the parallel-prefix results buffer is to include a contribution by the compute node further comprises determining whether the current position of the parallel prefix results buffer is greater than or equal to the rank of the compute node.

16. The computer program product of claim 13 wherein performing, by each ranked compute node, the parallel-prefix operation using the contributed identity elements and the contributed parallel-prefix contributions, yielding a result from the parallel-prefix operation further comprises performing the parallel-prefix operation with an arithmetic logic unit ('ALU') of a global combining network adapter for the global combing network.

17. The computer program product of claim 13 wherein contributing the identity element for the parallel-prefix operation further comprises injecting the identity element from dedicated hardware of the compute node.

18. The computer program product of claim 13 further comprising computer program instructions capable of configuring, by each ranked compute node, a global combining network adapter for the global combining network in dependence upon the parallel-prefix operation.

* * * * *